(12) United States Patent
Kabasawa

(10) Patent No.: US 7,709,129 B2
(45) Date of Patent: May 4, 2010

(54) GAS-LIQUID SEPARATING DEVICE AND ELECTRIC POWER GENERATING APPARATUS

(75) Inventor: Yasunari Kabasawa, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 143 days.

(21) Appl. No.: 11/998,514

(22) Filed: Nov. 30, 2007

(65) Prior Publication Data

US 2008/0131757 A1    Jun. 5, 2008

(30) Foreign Application Priority Data

Dec. 4, 2006    (JP) ............................. 2006-326886

(51) Int. Cl.
*H01M 8/00* (2006.01)
*B01D 53/22* (2006.01)
*B01D 59/12* (2006.01)
*B01D 19/00* (2006.01)
*B01D 63/00* (2006.01)
*B01D 65/00* (2006.01)
*B01D 71/00* (2006.01)
*C25B 9/00* (2006.01)
*C25C 7/00* (2006.01)

(52) U.S. Cl. ............................. 429/34; 429/12; 95/45; 96/155; 204/242; 210/500.21

(58) Field of Classification Search .................. 429/34, 429/19, 17, 26, 25, 44, 42, 30, 23, 13; 210/500.21; 204/242; 96/155; 95/45

See application file for complete search history.

(56) References Cited

U.S. PATENT DOCUMENTS

| | | | | |
|---|---|---|---|---|
| 3,923,426 A | * | 12/1975 | Theeuwes | ................... 204/630 |
| 2002/0025463 A1 | * | 2/2002 | Derflinger et al. | ............. 429/19 |
| 2004/0013928 A1 | * | 1/2004 | Yamauchi et al. | ............. 429/34 |
| 2004/0157098 A1 | * | 8/2004 | Wexel et al. | ................... 429/26 |
| 2005/0255373 A1 | * | 11/2005 | Kimura et al. | ................. 429/44 |

FOREIGN PATENT DOCUMENTS

| | | |
|---|---|---|
| JP | 2006-236598 A | 9/2006 |
| JP | 2006-236599 A | 9/2006 |

* cited by examiner

*Primary Examiner*—Jonathan Crepeau
*Assistant Examiner*—Kenneth Douyette
(74) *Attorney, Agent, or Firm*—Frishauf, Holtz, Goodman & Chick, P.C.

(57) ABSTRACT

Disclosed is a gas-liquid separating device comprising: a main body in which an internal space is formed, and an injecting hole and a discharging hole which reach the internal space are formed; an electric osmosis material housed inside the internal space, and delimits the internal space into a first and a second region, the first region being reached by the injecting hole and the discharging hole; a first electrode joined to the electric osmosis material on a first region side; and a second electrode joined to the electric osmosis material on a second region side, wherein gas including moisture vapor is injected to the first region from the injecting hole, water obtained by condensing the moisture vapor in the first region electrically osmosis through the electric osmosis material from the first region to the second region by applying voltage in between the first and the second electrode.

15 Claims, 3 Drawing Sheets

GAS-LIQUID SEPARATING DEVICE AND ELECTRIC POWER GENERATING APPARATUS

BACKGROUND OF THE INVENTION

1. Field of the Invention

The present invention relates to a gas-liquid separating device and an electric power generating apparatus, and more particularly, to a gas-liquid separating device which separates water from gas including moisture vapor, and to an electric power generating apparatus which comprises the gas-liquid separating device.

2. Description of Related Art

In recent years, small-sized electronic devices such as a laptop computer, a digital camera, wrist watch, a PDA (Personal Digital Assistance), an electronic databook, etc. have made outstanding progress and development. In order to substitute for a primary cell and a secondary cell which are used for a power source of an electronic device, research and development have been actively performed for a fuel cell which realizes large energy capacity.

A fuel cell is for converting chemical energy to electric energy by electrochemically reacting fuel and oxygen in the air. The electrochemical reaction in which the chemical energy of the fuel is directly converted to electric energy is applied to a fuel cell. Thus, a by-product is generated by the electrochemical reaction. The by-product is in a state of gas, and the gas includes carbon dioxide, unreacted fuel, oxygen, etc. and further includes water in a state of moisture vapor generated in the fuel cell. There is a technique in which the gas is cooled down by a radiation fin, a heat recovery device, etc., water in the gas is condensed, and the water in a state of liquid is reutilized (see for example, Japanese Patent Application Laid-Open Publication No. 2006-236598 and Japanese Patent Application Laid-Open Publication No. 2006-236599).

However, in the techniques described in Japanese Patent Application Laid-Open Publication No. 2006-236598 and Japanese Patent Application Laid-Open Publication No. 2006-236599, the water is condensed by cooling down the gas by a radiation fin or a heat recovery device. Thus, the apparatus is large in size because of having to be provided with the radiation fin or the heat recovery device.

Further, in the techniques described in Japanese Patent Application Laid-Open Publication No. 2006-236598 and Japanese Patent Application Laid-Open Publication No. 2006-236599, gravity is used in order to send and recover, to a predetermined position, water which is obtained by condensation by the radiation fin or the heat recovery device. When the apparatus is used in a state of being fixed in a predetermined position, the direction of the gravity with respect to the apparatus is constant. However, when the apparatus is applied to a portable equipment such as an electronic equipment, etc., the apparatus cannot be fixed in a predetermined position. Thus, the direction of the gravity with respect to the apparatus varies. Therefore, the water obtained by condensation flows to various positions depending on the varying directions of the apparatus, and the water cannot be accumulated in a fixed position.

SUMMARY OF THE INVENTION

It is, therefore, a main object of the present invention is to provide an apparatus which recovers water regardless of the direction of the apparatus, and/or to reduce the apparatus in size.

According to one aspect of the present invention, a gas-liquid separating device comprises:

a main body in which an internal space is formed, and an injecting hole and a discharging hole which reach the internal space are formed;

an electric osmosis material which is housed inside the internal space, and delimits the internal space into a first region and a second region, the first region being reached by the injecting hole and the discharging hole;

a first electrode which is joined to the electric osmosis material on a first region side; and a second electrode which is joined to the electric osmosis material on a second region side, wherein gas including moisture vapor is injected to the first region from the injecting hole, water which is obtained by condensing the moisture vapor in the first region electrically osmosis through the electric osmosis material from the first region to the second region by applying voltage in between the first electrode and the second electrode.

According to another aspect of the present invention, an electric power generating apparatus comprises:

a gas-liquid separating device comprising:
  a main body in which an internal space is formed, and an injecting hole and a discharging hole which reach the internal space are formed;
  an electric osmosis material which is housed inside the internal space, and delimits the internal space into a first region and a second region, the first region being reached by the injecting hole and the discharging hole;
  a first electrode which is joined to the electric osmosis material on a first region side; and
  a second electrode which is joined to the electric osmosis material on a second region side; and
an electric power generating cell for generating electric power by an electrochemical reaction of hydrogen and oxygen and for discharging gas including moisture vapor, wherein gas including moisture vapor discharged from the electric power generating cell is injected to the first region from the injecting hole, water which is obtained by condensing the moisture vapor in the first region electrically osmosis through the electric osmosis material from the first region to the second region by applying voltage in between the first electrode and the second electrode.

According to the present invention, an apparatus which recovers water regardless of the direction of the apparatus is provided, and/or the water can be recovered without providing devices other than the main body, and the apparatus can be reduced in size.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinbelow, preferred embodiments for carrying out the present invention will be described with reference to the drawings. Though a variety of technically preferable limitations for carrying out the invention are provided in the embodiments described below, the scope of the present invention is not limited to the flowing embodiments and illustrated examples.

Figure 1:
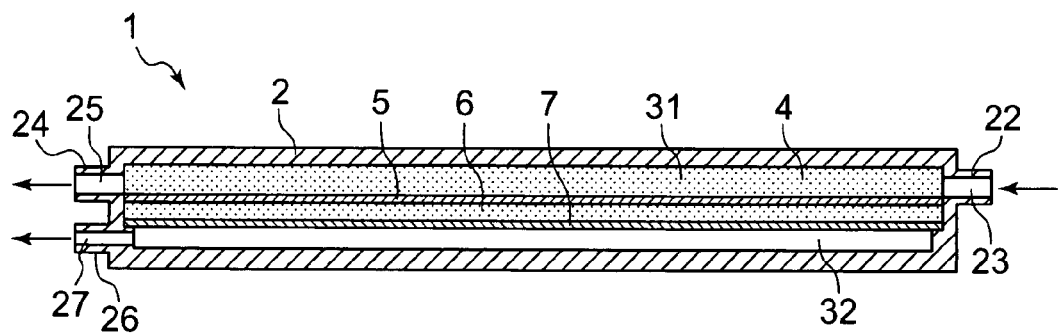
FIG. 1 is a cross sectional diagram showing the cross-section of a gas-liquid separating device of an embodiment of the present invention.
Figure 2:
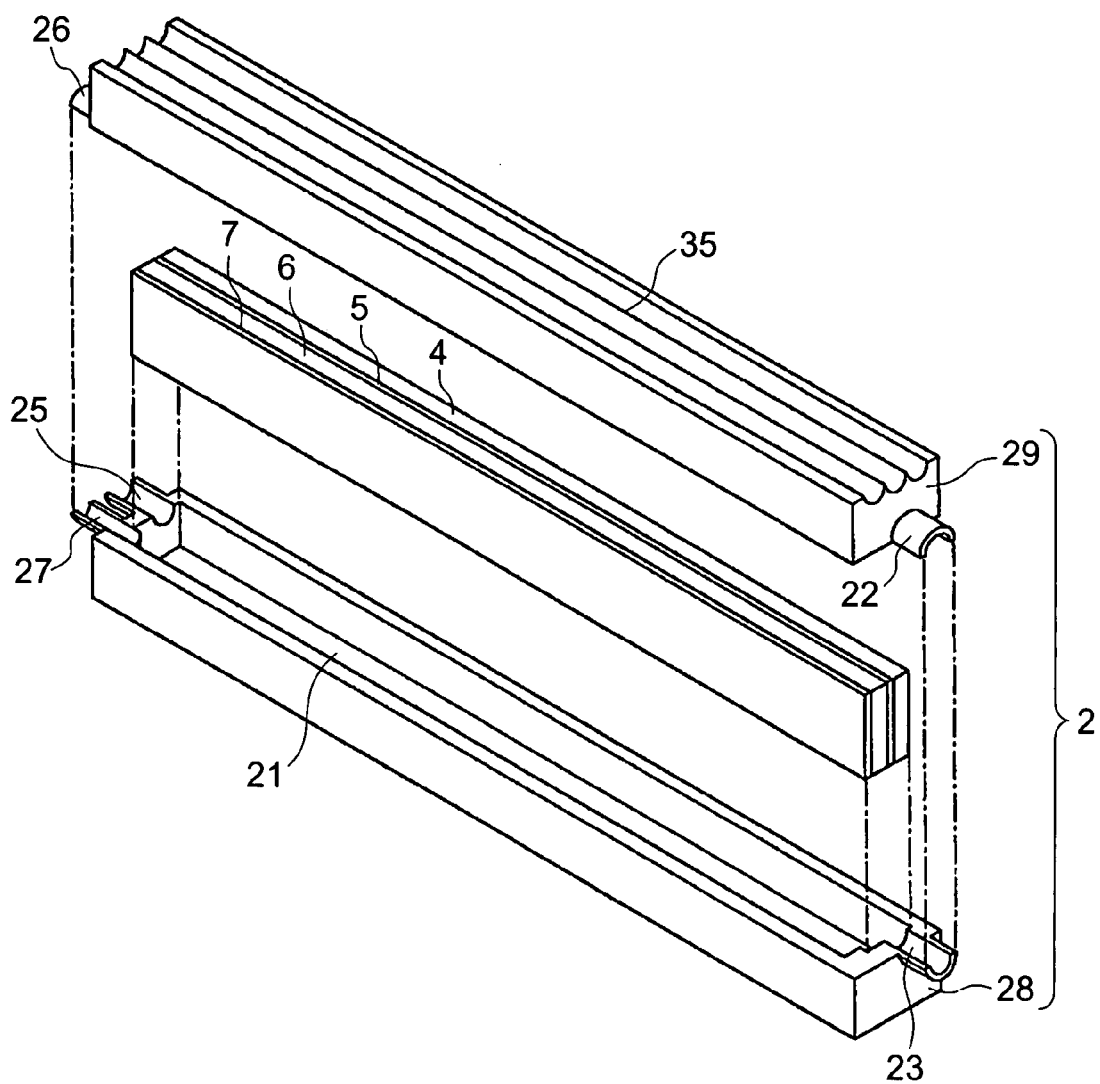
FIG. 2 is an exploded perspective diagram of the gas-liquid separating device shown in FIG. 1.

FIG. 1 is a cross sectional diagram showing the gas-liquid separating device 1, and FIG. 2 is an exploded perspective diagram of the gas-liquid separating device 1.

As shown in FIGS. 1 and 2, the gas-liquid separating device 1 comprises a main body case 2, a liquid capturing section 4 housed inside the main body case 2, a first electrode film 5, an electric osmosis material 6, and a second electrode film 7.

The main body case 2 is formed in a rectangular parallelepiped shape and a space 21 is formed inside the main body case 2. The internal space 21 is a substantially rectangular parallelepiped space which is elongated along the main body case 2 in a longitudinal direction.

On an end surface of one end of the main body case 2 in the longitudinal direction, a nipple 22 is provided in a state of being projected, and an injecting hole 23 penetrates the nipple 22 along the center line thereof from the tip of the nipple 22 to the internal space 21. On an end surface of the other end of the main body case 2 in the longitudinal direction, a nipple 24 and a nipple 26 are provided in a state of being projected. A discharging hole 25 penetrates the nipple 24 along the center line thereof from the tip of the nipple 24 to the internal space 21, and a drain hole 27 penetrates the nipple 26 along the center line thereof from the tip of the nipple 26 to the internal space 21. The discharging hole 25 is formed in a position opposing the injecting hole 23, and the drain hole 27 is formed in a position deviating from a position opposing the injecting hole 23.

On the exterior surface of the main body case 2, an irregularity unevenness 35 is formed by a plurality of grooves along the main body case 2 in the longitudinal direction. The main body case 2 is divided into two divided bodies 28, 29 at the surface where center lines of the nipples 22, 24 and 26 pass through. The main body 2 is configured by joining the divided bodies 28, 29. The main body case 2 is preferably made of metallic material, but may also be made of resinic material.

The electric osmosis material 6 is formed into a thin board or a sheet, and the electrode films 5, 7 are joined onto both of the surfaces of the electric osmosis material 6. A porous material, fiber material or a particle-filling material which are derivatives are used for the electric osmosis material 6, and as an example, a silica-fiber material or porous ceramics are used. The electrode films 5, 7 are formed by metal, especially by noble metal, and more specifically by platinum. The electrode films 5, 7 are formed by a sputter technique, evaporation method or other vapor growth methods. Because the electrode films 5, 7 are formed by a vapor growth method, many micropores are formed on the electrode films 5, 7, thereby liquid osmosis through the electrode films 5, 7. The electrode films 5, 7 may also be formed into a mesh-like structure, thereby liquid osmosis through the mesh.

The liquid capturing section 4 which is formed by a fiber material is laminated on the electrode film 5, and the liquid capturing section 4 contacts the electrode film 5. Because the liquid capturing section 4 is made of a fiber material, many microspaces are formed inside the liquid capturing section 4. The liquid capturing section 4 transmits gas and captures liquid, and by a capillary phenomenon of the liquid capturing section 4, liquid can be absorbed into the liquid capturing section 4. Further, the liquid capturing section 4 has a hydrophilic property, and a liquid absorbability of the liquid capturing section 4 is increased by the hydrophilic property. Specifically, the liquid capturing section 4 is nonwoven cloth. Other than nonwoven cloth, fiber solidified by a bonding material, a sponge, or the like may be used as the liquid capturing section 4.

The electric osmosis material 6 is housed in the internal space 21 so as to be parallel to the internal space 21 in the longitudinal direction, and the internal space 21 is delimited into two regions 31, 32 by the electric osmosis material. Among the two regions 31, 32 delimited by the electric osmosis material 6, the electrode film 5 is on the first region 31 side, and the electrode film 7 is on the other second region 32 side. The injecting hole 23 and the discharging hole 25 reach the first region 31, and the drain hole 27 reaches the second region 32. Further, the liquid capturing section 4 is housed in the first region 31 in the state of being contacted to the electrode film 5, and more preferably, the liquid capturing section 4 is filled into the first region 31.

Next, the operation of the gas-liquid separating device is explained.

Voltage is applied in between the first electrode film 5 and the second electrode film 7. Here, voltage is applied so that the first electrode film 5 has higher electric potential than the second electrode film 7. A control circuit may adjust the voltage in between the first electrode film 5 and the second electrode film 7, or a duty of time for applying voltage to the first electrode film 5 and the second electrode film 7 may be adjusted by for example PWM control.

When gas including moisture vapor is sent to the region 31 through the injecting hole 23, the gas passes through the liquid capturing section 4 and is discharged from the discharging hole 25. The moisture vapor included in the gas which passes through the liquid capturing section 4 is performed a capillary condensation by the liquid capturing section 4, and captured by the liquid capturing section 4. Water captured by the liquid capturing section 4 is absorbed to the liquid capturing section 4 in the state of liquid. The water captured by the liquid capturing section 4 spreads from the interior of the liquid capturing section 4 to the first electrode film 5, and the water contacts with the first electrode film 5. The water contacted the first electrode film 5 transmits the first electrode film 5 and is absorbed to the electric osmosis material 6.

Because electrolysis is generated in between the first electrode film 5 and the second electrode film 7, an electroosmotic flow phenomenon is generated. For example, when the electric osmosis material is porous silica, "—Si—OH" (a silanol group) is generated in the derivative, the silanol group becomes Si—O—, and the silica surface is negatively charged. On the other hand, in the neighborhood of the interfacial surface, positive ions (counter-ions) in the liquid are aggregated, and the positive electric charge becomes excessive. When voltage is applied in the state where the first electrode film 5 is an anode, and the second electrode film 7 is a cathode, excessive positive electric charge migrates in the cathode direction, and the entire water osmosis in the cathode direction by the viscosity property. Thus, the water in the electric osmosis material 6 osmosis from the first electrode film 5 side to the second electrode film 7 side, and bleeds out from the second electrode film 7 to the second region 32. The direction of voltage for electro-osmosing the water from the first electrode film 5 to the second electrode film 7 differs depending on the kind of the electric osmosis material 6, and depending on the kind of the electric osmosis material 6, the electric potential of the first electrode film 5 may be set higher than that of the electric potential of the second electrode film 7.

As described above, when the gas including the moisture vapor flows from the injecting hole 23 to the discharging hole 25 in the first region 31, a portion of the water in the gas is separated and osmosis to the second region 32, and the separated water is drained from the drain hole 27.

As described above, because the internal space of the main body case 2 is delimited into the first region 31 and the second region 32 by the electric osmosis material 6, the water does not flow backward from the second region 32 to the first region 31, and the water can be recovered regardless of the direction of the gas-liquid separating device 1. Especially, because the liquid capturing section 4 is filled into the first region 32, the water is captured by the liquid capturing section 4, and the captured water contacts with the first electrode film 5 and the electric osmosis material 6, regardless of the direction of the gas-liquid separating device 1.

Further, the electric osmosis material 6 is housed inside the main body case 2, and the water can be recovered without being provided with other apparatuses outside or elsewhere of the main body case 2. Thus, the gas-liquid separating device can be reduced in size. Specifically, the electric osmosis material 6 is formed into a thin board or a sheet, and the electrode films 5, 7 on both surfaces of the electric osmosis material 6 are formed into films. Thus, it is possible to reduce the size of the main body case 2, and of the gas-liquid separating device.

Further, because the liquid capturing section 4 is housed in the first region 31, the moisture vapor is trapped in the liquid capturing section 4, and it is easy for the water to contact the first electrode film 5. Thus, the water can be efficiently separated from the gas by the gas-liquid separating device 1. Specifically, the liquid capturing section 4 is filled into the first region 31, and most of the gas which is introduced into the first region 31 passes through the liquid capturing section 4. Thus, the capturing efficiency of water is high. Moreover, because the irregularity unevenness 35 is formed on the exterior surface of the main body case 2, the heat radiation effect is high. Thus, the condensation efficiency of water in the liquid capturing section 4 is high. Incidentally, the irregularity unevenness 35 may be a main body case 2 provided with a cooling fin.

Further, the osmosis rapidity of water can be altered by adjusting the voltage in between the first electrode film 5 and the second electrode film 7, or by adjusting the duty of time for applying voltage to the first electrode film 5 and the second electrode film 7. That is to say, the amount of water to be recovered per unit of time from the first region 31 to the second region 32 can be altered.

<Modification 1>

Figure 3:
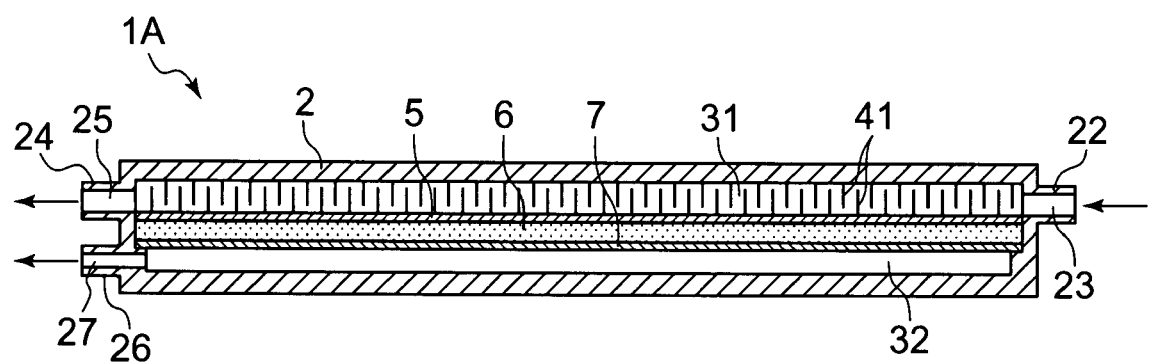
FIG. 3 is a cross sectional diagram showing the cross-section of a gas-liquid separating device of a modification.

FIG. 3 is a cross sectional diagram of a gas-liquid separating device 1A as a modification. As shown in FIG. 3, instead of filling the liquid capturing section 4 which is made of fiber material into the first region 31, a plurality of fins 41 may be arranged in the first region 31 as the liquid capturing section. The plurality of fins 41 are alternately arranged from the injecting hole 23 to the discharging hole 25, thereby a winding flow passage is formed. These fins 41 are preferably made of metallic material. The winding flow passage is formed by these fins 41, and the cross sectional area of the flow passage is small. Thus, when the gas including moisture vapor flows through the flow passage, the moisture vapor is performed a capillary condensation and becomes liquid. Further, among the fins 41, especially those which are connected to the main body case 2 have a temperature relatively lower than that of the moisture vapor, and the moisture vapor builds up condensation on the surfaces of the fins 41. The water in the state of liquid osmosis from the first region 31 to the second region 32 by an electroosmotic phenomenon. The gas-liquid separating device 1A is the same as the gas-liquid separating device 1 shown in FIG. 1 except the liquid capturing section. Thus, the mutually corresponding parts of the gas-liquid separating device 1A and the gas-liquid separating device 1 are allotted with the same symbols, and the detail description of the gas-liquid separating device 1A is omitted.

<Modification 2>

Instead of a fiber material or the plurality of fins 41, a thin metallic wire in the state of being coiled over and looped around may be filled in the first region 31. The thin metallic wire which is looped around is the liquid capturing section.

<Modification 3>

The liquid capturing section need not be housed in the first region 31. However, in view of trapping the water in the state of liquid in the first region 31, it is preferable that the liquid capturing section is housed in the first region 31.

<Modification 4>

The discharging hole 25 may transmit the gas and may also be occluded by a gas-liquid separating film which does not transmit liquid. When the discharging hole 25 is occluded by the gas-liquid separating film, water can easily be trapped in the first region 31, and water can be recovered efficiently. The occluding of the discharging hole 25 by the gas-liquid separating film can be applied not only to the gas-liquid separating device 1 shown in FIG. 1, but also to Modifications 1 to 3.

<Modification 5>

Without forming the drain hole 27 in the main body 2 or with providing a switching valve to the drain hole 27, the second region 32 may store water. In this case, it is better to enlarge the capacity of the second region 32. The storing of water in the second region 32 in this manner can be applied not only to the gas-liquid separating device 1 shown in FIG. 1, but also to Modifications 1 to 4.

<Application>

Figure 4:
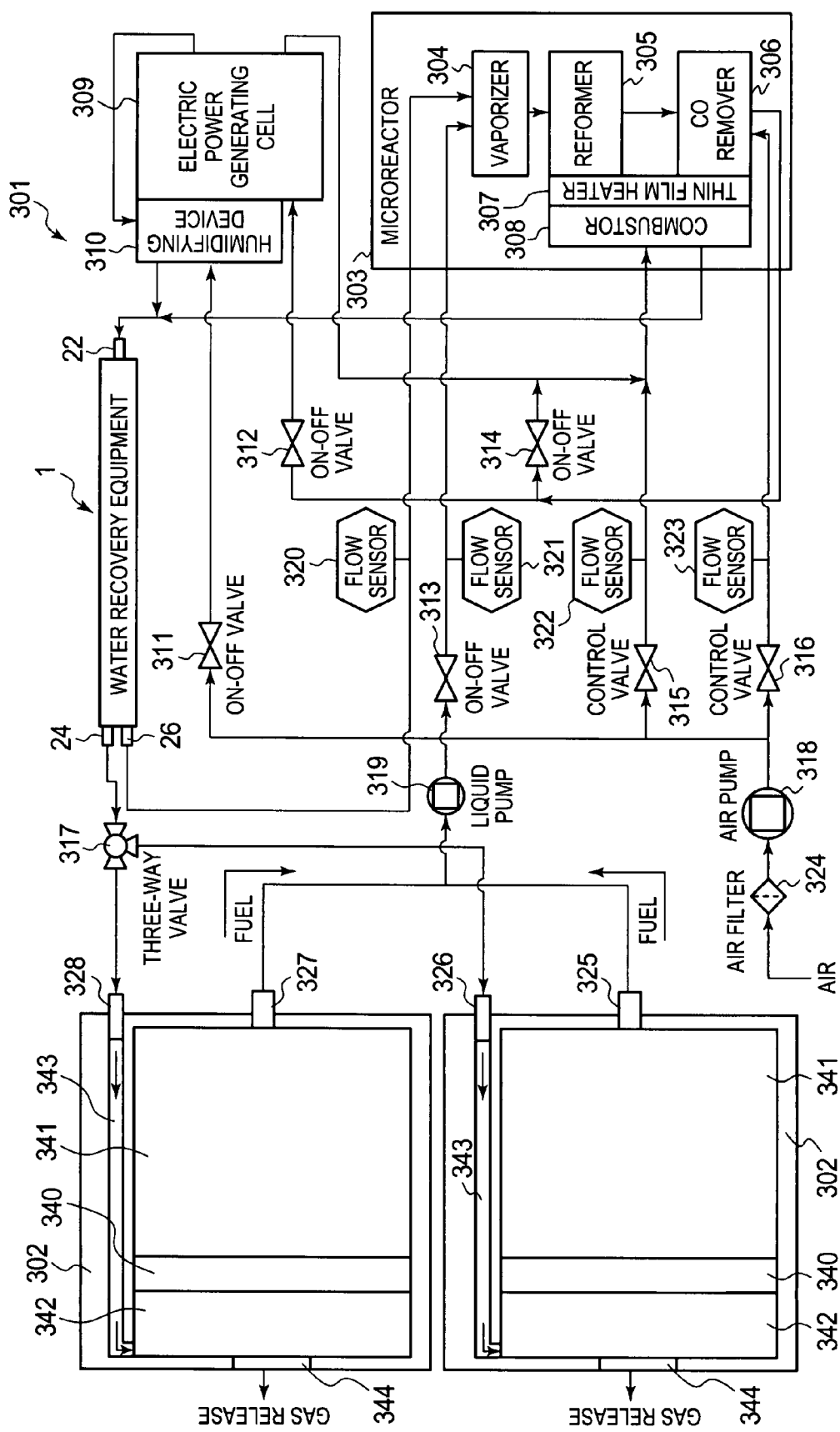
FIG. 4 is a diagram showing an electric power generating apparatus which comprises a gas-liquid separating device.

FIG. 4 is a block diagram showing an electric power generating apparatus 301 to which a gas-liquid separating device 1 is applied. Incidentally, one of the gas-liquid separating devices of the Modification 1 to 5 may be applied instead of the gas-liquid separating device shown in FIG. 1.

As shown in FIG. 4, the electric power generating apparatus 301 comprises, other than the gas-liquid separating device, two fuel cartridges 302, a microreactor 303, an electric power generating cell 309, a humidifying device 310, valves 311-317, pumps 318 and 319, flow sensors 320-323, an air filter 324, and connectors 325 and 326. The electric power generating device 301 is mounted on the electronic device main body, and the electric power generated by the electric power generating device 301 is used for the electronic device main body. Thus, the electronic device main body is operated.

Inside the fuel cartridge 302, a following body 340 is provided, and the internal space of the fuel cartridge 302 is delimited to two chambers 341 and 342. In one chamber 301 (hereinafter referred to as a fuel storage chamber 341), liquid fuel (methanol for example) is stored. When the connector 325 or the connector 327 is connected to the supply port of the fuel cartridge 302, liquid fuel in the fuel cartridge 302 is vacuumed up by the liquid pump 319. As the liquid fuel in the fuel storage chamber 341 is consumed, the following body 340 moves toward the supply port. Thereby the capacity of the fuel storage chamber 341 is decreased, and the capacity of a chamber 342 (hereinafter referred to as a waste liquid chamber 342) is increased. Further, a duct 343 is provided in the fuel cartridge 302, and one end of the duct 343 reaches the fuel storage chamber 341. Moreover, in the fuel cartridge 302, an exhaust hole which reaches the waste liquid chamber 342 is formed, and the exhaust hole is occluded by a gas-liquid separating film 344. The fuel cartridge 302 can be installed to and removed from the electronic device main body. When the fuel cartridge 302 is installed to the electronic device main body, the connector 325 or the connector 327 is connected to the supply port of the fuel cartridge 302, and the connector 326 or the connector 328 is connected to the duct 343.

The connector 325 and the connector 327 are connected to the liquid pump 319 through a flow passage. The liquid pump 319 is one for sending liquid of the liquid fuel to a vaporizer 304 in the microreactor 303 from the fuel cartridge 302. An on-off valve 313 is provided in between the vaporizer 304 and the liquid pump 319, and the flow of the liquid fuel from the liquid pump 319 to the vaporizer 304 is blocked and allowed by switching the on-off valve 313. The flow amount of the liquid fuel from the liquid pump 319 to the vaporizer 304 is detected by the flow sensor 321 and is converted to an electric signal.

The air pump 318 is one for vacuuming up the air from outside, and for sending the air to a CO remover 306 and a combustor 308 in the microreactor 303 and to the humidifying device 310. The humidifying device 310 is one for humidifying the air sent from the air pump 318.

The external air passes through the air filter 324 before being vacuumed up by the air pump 318, and dust in the air is captured by the air filter 324. A control valve 316 is provided in between the air pump 318 and the CO remover 306, and the flow amount of the air which is sent to the CO remover 306 is controlled by the control valve 316. The flow amount is detected by the flow sensor 323 and is converted to an electric signal. A control valve 315 is provided in between the air pump 318 and the combustor 308, and the flow amount of the air which is sent to the combustor 308 is controlled by the control valve 315. The flow amount is detected by a flow sensor 322 and is converted to an electric signal. An on-off valve 311 is provided in between the air pump 318 and the vaporizer 310, and the flow of the air which is sent to the combustor 308 is blocked and allowed by switching the on-off valve 311.

The microreactor 303 comprises a reformer 305 and a thin film heater 307, other than the vaporizer 304, the CO remover 306 and the combustor 308.

Liquid fuel from the fuel cartridge 302 and water which is separated by the gas-liquid separating device 1 (water osmosed in the second region 32), are sent to the vaporizer 304. The liquid fuel and the water are mixed in the vaporizer 304. The vaporizer 304 is one for vaporizing liquid fuel and water. Electric heat from the thin film heater 307 or combustion heat from the combustor 308 is applied to energy required for the vaporization in the vaporizer 304.

The gas mixture of fuel and water which have been vaporized in the vaporizer 304 is sent to the reformer 305. In the reformer 305, the fuel and the water cause a reforming reaction by a catalyst. Thus, hydrogen gas is generated and carbon monoxide gas is also slightly generated (in the case where the fuel is methanol, see the chemical formulas (1) and (2) described below). Electric heat from the thin film heater 307 or combustion heat from the combustor 308 is applied to energy required for the reforming reaction in the reformer 305.

$$CH_3OH + H_2O \rightarrow 3H_2 + CO_2 \qquad (1)$$

$$H_2 + CO_2 \rightarrow H_2O + CO \qquad (2)$$

The hydrogen gas, etc. which is generated in the reformer 305 is sent to the CO remover 306, and external air is also sent to the CO remover 306. In the CO remover 306, a selected oxidation is caused, in which the carbon monoxide gas is preferentially oxidized by a carbon monoxide removing catalyst. Thus the carbon monoxide gas is removed (see the chemical formula (3) described below).

$$2CO + O_2 \rightarrow 2CO_2 \qquad (3)$$

The hydrogen gas, etc. which have passed through the CO remover 306 are supplied to a fuel electrode (an anode) of the electric power generating cell 309. The electric power generating cell 309 comprises the fuel electrode, an oxygen electrode, and an electrolyte film which is sandwiched in between the fuel electrode and the oxygen electrode. In the oxygen electrode of the electric power generating cell 309, air humidified by the humidifying device 310 is supplied. The electric power generating cell 309 is for electrochemically reacting hydrogen gas supplied to the fuel electrode and oxygen gas supplied to the oxygen electrode. Thus electric energy is generated. When electrolyte of the electric power generating cell is made of a solid polymer electrolyte membrane, the following is occurred in the fuel electrode. Thus, the hydrogen gas is separated into hydrogen ions and electrons under the action of microparticle catalyst in the fuel electrode, as shown in electrochemical formula (4). In the oxygen electrode, the electrons having moved to the oxygen electrode, the oxygen gas in the air and the hydrogen gas having passed through the solid polymer electrolyte membrane are reacted. Thus, water is generated, as shown in electrochemical formula (5). The electric power generated by the electrochemical reaction of the electric power generating cell is supplied to the electronic device main body. Thus the electronic device main body is operated.

$$H_2 \rightarrow 2H^+ + 2e^- \qquad (4)$$

$$2H^+ + 1/2 O_2 + 2e^- \rightarrow H_2O \qquad (5)$$

Offgas which includes unreacted hydrogen gas in the fuel electrode of the electric power generating cell 309 is sent to the combustor 308. Gas which includes water (moisture vapor) generated in the oxygen electrode of the electric power generating cell 309 is sent to the humidifying device 310. Thus both the offgas and the gas including water are used for humidifying the air. The humidifying device 310 comprises a hollow fiber membrane, etc., and the gas including water, etc. generated in the oxygen electrode of the electric power generating cell 309 passes through the interior of the hollow fiber membrane. The air sent from the air pump 318 passes through the surroundings of the hollow fiber membrane, and the air surrounding the hollow fiber membrane is humidified by the humidity of the gas which has passed through the interior of the hollow fiber membrane. Thus, the humidified air is sent to an air electrode (a cathode) of the electric power generating cell 309. The gas which has passed through the interior of the hollow fiber membrane is sent to the injecting hole 23 of the gas-liquid separating device 1.

The offgas (including hydrogen gas) sent to the combustor 308 is mixed with the air which is sent to the combustor 308 by the air pump 318. In the combustor 308, the hydrogen gas is oxidized by a catalyst in the combustor 308. Thus, combustion heat is generated and also water (moisture vapor) is generated. Gas including water, etc. generated in the combustor 308 is sent to the injecting hole 23 of the gas-liquid separating device 1. As described above, the combustion heat in the combustor 308 is conducted to the reformer 305 and the vaporizer 304. Thus the combustion heat is used as vaporization heat in the vaporizer 304 and reaction heat in the reformer 305.

When the gas including waters (moisture vapor) generated in the oxygen electrode of the electric power generating cell 309 and the combustor 308 is injected to the injecting hole 23 of the gas-liquid separating device 1, water (liquid) is discharged through the drain hole 27, and dehumidified gas is discharged through the discharging hole 25. Gas and liquid is separated in this manner in the gas-liquid separating device 1. The water discharged from the drain hole 27 is sent to the vaporizer 304 to be mixed with liquid fuel and to be vaporized. The flow amount of the water is detected by the flow sensor 320 and is converted to an electric signal.

The gas discharged from the discharging hole 25 of the gas-liquid separating device 1 is sent to the connector 326 or the connector 328 through a three-way valve 317. The three-way valve 317 is for switching the destination of the gas discharged from the discharging hole 25 of the gas-liquid separating device 1. There are cases in which the destination is only the connector 325, the destination is only the connector 328, and the destination is both the connector 325 and the connector 328.

The gas sent to the connector 325 and the connector 328 from the discharging hole 25 of the gas-liquid separating device 1 is sent to the waste liquid chamber 342 through the duct 343. When the gas passes through the duct 343, the gas is cooled down by heat discharge radiation, and water in the gas is condensed. Therefore, water in a state of liquid is stored in the waste liquid chamber 342. Further, the gas sent to the waste liquid chamber 342 is transmitted through the gas-liquid separating film 344 and released outside. The gas-liquid separating film 344 blocks liquid, and thus, water (liquid) stored in the waste liquid chamber 342 does not pass through the waste liquid chamber 344.

In this electric power generating apparatus 301, the electric power generating cell 309 of a fuel-cell type and the gas-liquid separating device 1 are provided as different bodies. Thus, water generated in the oxygen electrode of the electric power generating cell 309 is not condensed in the oxygen electrode, but is condensed in the gas-liquid separating device 1. Because the water is not condensed in the oxygen electrode, the oxygen electrode is not coated by the water, and the oxygen reaction is easily occurred in the oxygen electrode.

Incidentally, the fuel cell in which electric power is generated by hydrogen in the electric power generating cell 309 has been described. However, a fuel cell in which electric power is generated by methanol in the electric power generating cell 309 may also be used. In this case, the reformer 305 and the CO remover 306 need not be provided.

The entire disclosure of Japanese Patent Application No. 2006-326886 filed on Dec. 4, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:
1. A gas-liquid separating device comprising:
a main body in which an internal space is formed, and in which an injecting hole, a discharging hole, and a drain hole which reach the internal space are respectively formed;
an electric osmosis material which is housed inside the internal space, and delimits the internal space into a first region and a second region;
a first electrode which is joined to the electric osmosis material on a first region side; and
a second electrode which is joined to the electric osmosis material on a second region side,
wherein the injecting hole and the discharging hole are formed in the main body so as to reach the first region,
wherein the drain hole is formed in the main body so as to reach the second region, and
wherein gas including moisture vapor is injected to the first region from the injecting hole, water which is obtained by condensing the moisture vapor in the first region is caused to electrically osmose through the electric osmosis material from the first region to the second region by applying voltage in between the first electrode and the second electrode, gas which is obtained by removing the moisture vapor from the gas including the moisture vapor is discharged from the discharging hole, and the water in the second region which is obtained by the condensing is discharged from the drain hole.

2. The gas-liquid separating device according to claim 1, further comprising a liquid capturing section which is housed in the first region and which captures water in the gas.

3. The gas-liquid separating device according to claim 2, wherein the liquid capturing section is housed in the first region so that the liquid capturing section contacts with the first electrode.

4. The gas-liquid separating device according to claim 3, wherein the liquid capturing section absorbs water which is captured and contacts the water to the first electrode.

5. The gas-liquid separating device according to claim 2, wherein the liquid capturing section is made of a fiber material.

6. The gas-liquid separating device according to claim 5, wherein the liquid capturing section has a hydrophilic property.

7. The gas-liquid separating device according to claim 2, wherein the liquid capturing section has a plurality of fins arranged in the first region.

8. The gas-liquid separating device according to claim 1, wherein an irregularity unevenness is formed on an exterior surface of the main body.

9. The gas-liquid separating device according to claim 1, further comprising a gas-liquid separating film which blocks the discharging hole, transmits gas and does not transmit liquid.

10. The gas-liquid separating device according to claim 1, wherein the injecting hole and the discharging hole are formed in opposing positions so as to sandwich the internal space.

11. The gas-liquid separating device according to claim 10, wherein the internal space is an elongated space from the injecting hole to the discharging hole.

12. An electric power generating apparatus comprising:
a gas-liquid separating device comprising:
a main body in which an internal space is formed, and in which an injecting hole, a discharging hole, and a drain hole which reach the internal space are respectively formed;
an electric osmosis material which is housed inside the internal space, and delimits the internal space into a first region and a second region;
a first electrode which is joined to the electric osmosis material on a first region side; and a second electrode which is joined to the electric osmosis material on a second region side, wherein the injecting hole and the discharging hole are formed in the main body so as to reach the first region, and wherein the drain hole is formed in the main body so as to reach the second region, wherein the electric power generating apparatus further comprises:

an electric power generating cell for generating electric power by an electrochemical reaction of hydrogen and oxygen and for discharging gas including moisture vapor, and wherein gas including moisture vapor discharged from the electric power generating cell is injected to the first region from the injecting hole, water which is obtained by condensing the moisture vapor in the first region is caused to electrically osmose through the electric osmosis material from the first region to the second region by applying voltage in between the first electrode and the second electrode, gas which is obtained by removing the moisture vapor from the gas including the moisture vapor is discharged from the discharging hole, and the water in the second region which is obtained by the condensing is discharged from the drain hole.

13. The electric power generating apparatus according to claim 12, wherein the gas-liquid separating device further comprises a liquid capturing section which is housed in the first region and which captures water in the gas.

14. The electric power generating apparatus according to claim 12, further comprising a combustor for combusting unreacted hydrogen in the electrochemical reaction in the electric power generating cell and for discharging gas including moisture vapor generated by combusting the unreacted hydrogen, wherein the gas including the moisture vapor discharged from the combustor is injected to the first region from the injecting hole.

15. The electric power generating apparatus according to claim 12, further comprising:

a fuel storage chamber for storing liquid fuel;

a vaporizer for mixing and vaporizing water that electrically osmoses to the second region and the liquid fuel supplied from the fuel storage chamber; and a reformer for generating hydrogen from gas vaporized in the vaporizer, wherein the hydrogen generated in the reformer is supplied to the electric power generating cell.

* * * * *